Figure 1:
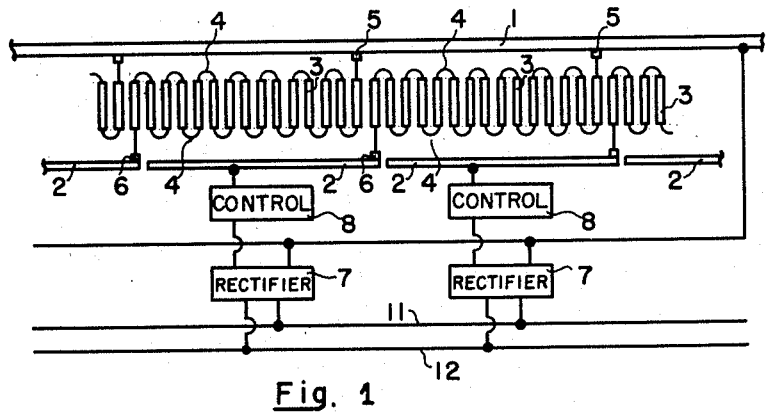

Dec. 31, 1963  T. E. HATTERSCHIDE  3,116,451
BATTERY CHARGE INDICATOR
Filed Nov. 23, 1960

*INVENTOR.*
THOMAS E. HATTERSCHIDE

United States Patent Office 3,116,451
Patented Dec. 31, 1963

3,116,451
BATTERY CHARGE INDICATOR
Thomas E. Hatterschide, Cleveland Heights, Ohio, assignor to The Electric Storage Battery Company, a corporation of New Jersey
Filed Nov. 23, 1960, Ser. No. 71,279
5 Claims. (Cl. 324—29.5)

The present invention generally relates to means for determining the amount of charge or ampere-hour import given to a storage battery element during initial formation. More specifically, the present invention is concerned with means for determining the state of charge of battery elements formed by means of a battery charging and forming apparatus of the type described in U.S. Patent 2,528,266, issued to Robert A. Daily et al.

The battery charging and forming apparatus disclosed in the aforementioned patent comprises a conveyor carrying a plurality of trays, each adapted to receive a plurality of cell elements made up of a group of interconnected positive plates and interconnected negative plates which are spaced with interleaved separators. The conveyor moves the trays successively past a loading station where unformed cell elements are placed in the trays and interconnected, a station where electrolyte is added to the trays, a station where the electrolyte is discharged from the trays, and back to the first station where the formed and charged cell elements are removed from the trays and replaced with unformed cell elements. While the trays pass between the second and third stations, the cell elements therein are connected to suitable sources of electric current for charging or forming the cell elements. If the cell element formation schedule requires the use of two electrolyte solutions, the apparatus can be provided with dumping and refilling stations between the filling and discharging stations described above.

The apparatus is arranged so that cell elements are formed in groups comprising ninety series-connected cell elements. Since each tray is adapted to hold six cells, fifteen adjacent trays are connected in series to provide the bank of ninety cell elements. As the conveyor moves the trays along, each bank of fifteen interconnected trays are connected successively with a plurality of different sources of charging current, each set to provide the charging current required for each successive stage of formation. This is accomplished by providing each bank of fifteen adjacent trays with a pair of contact brushes, one adapted to engage continuously with a negative bus bar and the other adapted to engage a divided positive bus bar. The divided positive bus bar comprises a plurality of sections, each corresponding to a successive stage of formation, and each adapted to be energized from a separate source of charging current.

Since the charging currents circuit for the individual cell element is a series-circuit including the brushes which make contact with the bus bars and the removable connectors which interconnect the ninety cell elements into banks for charging it has heretofore been standard practice after formation to assemble cell elements from each bank into batteries for testing to determine if the elements have received sufficient formation. Because the forming apparatus is operated continuously, all of the cell elements in a bank must be disconnected from each other, removed from the forming apparatus and set aside to await the testing of sample elements before they can be assembled into battery or reloaded into the forming apparatus for additional formation.

This is obviously a laborious time-consuming and expensive operation. Unfortunately, conventional methods for measuring the ampere-hour import have been found to be unadaptable for utilization on forming apparatus of the type described in the Daily et al. patent due to the highly corrosive environment surrounding the machine as well as the geometry of the machine.

It is therefore a specific object of the present invention to provide a new and improved means for determining the amount fo formation given to battery elements in a forming apparatus of the type described.

It is another object of the present invention to provide a new and improved apparatus for indicating the ampere-hour import given to battery elements undergoing formation in an apparatus of the type described which is characterized by compact design readily adapted to be protected from the corrosive environment of the machine.

In accordance with the present invention, periodic voltage pulses are applied between one of the bus bars of the forming machine and ground. These pulses are of sufficient magnitude to energize a pulse activated counter which is mounted in a protective cover on the leading tray of each bank of fifteen interconnected trays. Also mounted on the tray in the protective cover is a suitable shunt resistor and a voltage sensitive relay. The shunt is adapted to be connected in series with the interconnected cell elements being formed in the bank of fifteen trays. The voltage sensitive relay which is connected across the shunt is adapted to be energized when the cell elements are receiving the minimum current input which will insure acceptable formation. The contacts of the voltage sensitive relay are connected to control the energization of the counter by the voltage pulses applied to the bus bar. Accordingly, if the cell elements have received a sufficient ampere-hour input to insure adequate formation, the counter will indicate an adequate number of counts. If the counter indicates a lower count, the cell elements have not received the desired current input for a sufficient length of time.

Figure 2:
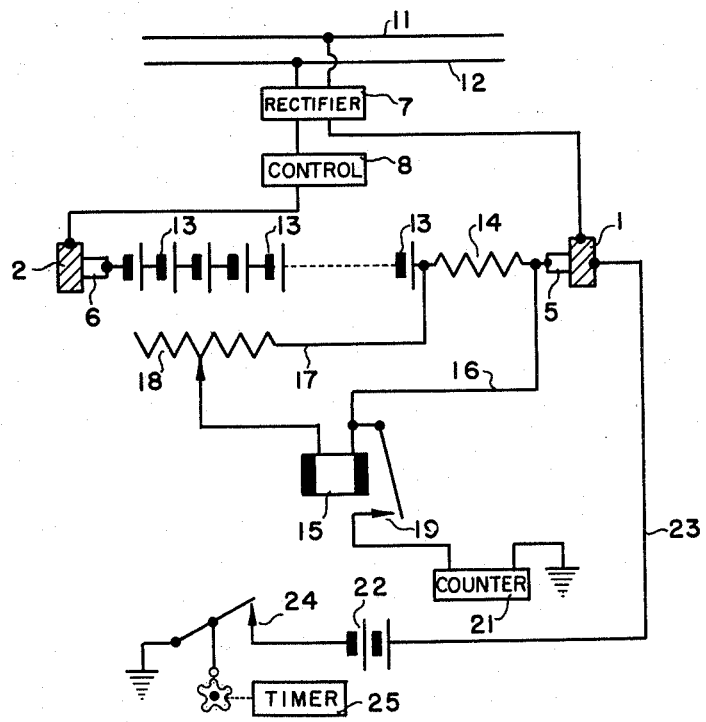

A better understanding of the present invention may be had with the following description when read with reference to the accompanying drawings which:

FIG. 1 is a schematic circuit diagram of the charging circuit utilized in a forming apparatus in the Daily et al. patent; and FIG. 2 is a circuit diagram of the battery charge indicator of the present invention.

Referring now to FIGURE 1, the numeral 1 designates the continuous bus bar of a forming machine in accordance with the teachings of the aforementioned Daily et al. patent and the numeral 2 designates the divided bus bar of that machine. As shown, a group of fifteen trays 3, interconnected by means of the conductors 4, make electrical contact with the bus bars 1 and 2 by means of the brushes 5 and 6 respectively. As explained hereinbefore, each of the trays 3 is adapted to hold six interconnected cell elements and, accordingly, the fifteen interconnected trays provides a series circuit including ninety interconnected cell elements making contact with the bus bars 1 and 2 through the brushes 5 and 6. As the conveyor carrying the trays 3 moves along, each interconnected bank of fifteen trays is in continuous engagement with the continuous bus bar 1 and in successive engagement with the segments of the divided bus bar 2. The segmented bus bar 2 is utilized in order to provide the cell elements with different power inputs at the various stages of formation. Accordingly, each of the segments of the divided bus bar 2 is energized from its own rectifier circuit 7 through a suitable control circuit 8. For purposes of explanation, each of the rectifier circuits 7 are shown as being energized from a common source alternating current, the conductors 11 and 12. Thus, as the conveyor moves the trays 3 continuously through the forming machine, the cell elements therein are connected sequentially to each of the rectifier circuits 7 for charging or formation. If the formation circuit for the cell elements has been properly established and maintained and if the forming machine is functioning in the proper manner the cell elements in a given bank of trays should be properly formed when the bank has traversed all of the segments of the bus bars. In operational embodiments of a forming machine in accordance with the Daily et al. patent, twenty-one such segments are provided and in operation, a time period on the order of six hours is required for a given bank of trays to traverse these segments.

Referring now to FIGURE 2, there is shown a circuit diagram of the battery charge indicator of the present invention which is adapted to indicate whether or not the cell elements in a given bank of trays have received adequate formation. Similar reference characters are employed to designate components similar to those discussed in connection with FIGURE 1. The numeral 13 designates the various cell elements in a given bank of trays which are connected in series between the brushes 5 and 6 for connection to the bus bars 1 and 2. As shown, a resistor 14 is connected in series with the cell elements 13. As will be explained in more detail hereinafter, the resistor 14 is utilized to develop a voltage proportional to the charging for formation current supplied to the cell elements 13. The voltage developed across the resistor 14 by this charging current is utilized to energize a voltage sensitive relay 15 which is connected across the resistor 14 by means of the conductors 16 and 17 and an adjustable resistor 18. The relay 15 has associated therewith a pair of contacts 19 one of which is connected to the brush 5 by means of the conductor 16 and the other of which is connected to ground through a pulse-activated counter 21.

The counter 21 is of the type which is operative to register a count upon being pulsed by a suitable electric signal. To this end, a suitable source of voltage, shown here as a battery 22, is provided and is connected between the bus bar 1 and ground by means of a conductor 23 and a pair of contacts 24 associated with a timer 25. Accordingly, if the contacts 19 associated with the relay 15 are closed simultaneously with the closing of the contacts 24 associated with the timer 25, the counter 21 will register a count. This circuit can be traced from ground through the contacts 24, the timer 25, the battery 22, the conductor 23, the bus bar 1, the brush 5, the conductor 16, the contacts 19 of the relay 15, and through the counter 21 to ground.

In operation, the timer 25 applies D.C. voltage pulses from the battery 22 at regular intervals between the bus bar 1 and ground. These pulses will operate the counter 21 when the contacts 19 of the voltage sensitive relay 15 are closed. The contacts 19 to the relay 15 will be closed when the charging current for the batteries 13 is of sufficient magnitude to produce a voltage drop across the shunt resistor 14 to energize the voltage sensitve relay 15. The adjustable resistor 18 is provided to permit the adjustment of the operating point of the relay 15 to correspond with the minimum acceptable charging current for the type of cell elements 13 being formed in the machine. Thus, if the timer 25 pulses the bus bar 1 at a rate of 10 times per minute for 200 minutes charging time and if the charging current flowing through the resistor 14 is above the minimum required value the counter 21 will register 2,000 counts thereby indicating that the cell elements 13 have received the minimum acceptable formation. If a lower count is shown, the desired current has not been applied for the proper length of time.

Due to its simplicity the charge-indicating apparatus of the present invention is particularly adapted for miniaturization. Thus, the shunt resistor 14, the adjustable resistor 18, the relay 15, and the counter 21 can be readily encapsulated in an environment-resisting cover and mounted with ease on the leading tray of a fifteen tray bank of the forming machine. In practice, this protective cover is provided with a window for viewing the counter, thus permitting the operator to tell at a glance whether or not to remove the cell elements from the machine or to permit them to pass through again to receive an additional charge. In addition to indicating whether a given bank of cell elements have received sufficient formation, consistently low readings on the counter charge indicate faulty brush connections or some other defect in the charging circuit associated with the forming machine.

Having described the present invention, that which is claimed as new is:

1. An apparatus for indicating the amount of current supplied to battery cell elements undergoing formation in a forming apparatus of the type in which a plurality of containers are moved by a conveyor support, said battery cell elements being immersed in electrolyte in said containers and connected in series to provide a cell bank which bank is connected to a pair of charging current-carrying bus bars by brushes moving with said conveyor comprising, in combination, means for applying periodic voltage pulses to one of said bus bars, counting means adapted to be energized by said pulses, and means responsive to the magnitude of the charging current supplied to said series connected cell elements for controlling the energization of said counter by said pulses in accordance with the magnitude of said charging current.

2. An apparatus for indicating the amount of current supplied to battery cell elements undergoing formation in a forming apparatus of the type in which a plurality of containers are moved by a conveyor support, said battery cell elements being immersed in electrolyte in said containers and connected in series to provide a cell bank which bank is connected to a pair of charging current-carrying bus bars by brushes moving with said conveyor comprising, in combination, means for applying periodic voltage pulses to one of said bus bars, counting means connected to said bus bars by one of said brushes and adapted to be energized by said pulses, and means connected to said charging current-carrying bus bars by said brushes and responsive to the magnitude of the charging current supplied to said series connected cell elements for controlling the energization of said counter by said pulses in accordance with the magnitude of said charging current.

3. An apparatus for indicating the amount of current supplied to battery cell elements undergoing formation in a forming apparatus of the type in which a plurality of containers are moved by a conveyor support, said battery cell elements being immersed in electrolyte in said containers and connected in series to provide a cell bank which bank is connected to a pair of charging current-carrying bus bars by brushes moving with said conveyor comprising, in combination, means for applying periodic voltage pulses to one of said bus bars, counting means moving with said cell elements and connected to said bus bar by one of said brushes, said counting means being adapted to be energized by said pulses, and means carried with said cell elements and responsive to not less than the minimum acceptable charging current supplied to said series connected cell elements for controlling the energization of said counter by said pulses in accordance with the magnitude of said charging current, said counter indicating a count proportional to the time said cell elements receive at least said minimum acceptable charging current.

4. An apparatus for indicating the amount of current supplied to battery cell elements undergoing formation in a forming apparatus of the type in which a plurality of containers are moved by a conveyor support, said battery cell elements being immersed in electrolyte in said containers and connected in series to provide a cell bank which bank is connected to a pair of charging current-carrying bus bars by brushes moving with said conveyor comprising, in combination, timing means for applying periodic direct current voltage pulses between one of said bus bars and ground, counting means moving with said cell elements and connected to said bus bar by means of the brush in contact therewith, said voltage pulses being of a magnitude sufficient to energize said counter, voltage sensitive relay means adapted to be energized by a voltage drop proportional to the minimum acceptable charging current, said relay means being connected when energized to connect said counting means for energization by said voltage pulses when energized, said counter thus indicating a count proportional to the time said cell elements receive said minimum acceptable charging current.

5. An apparatus for indicating the amount of current supplied to battery cell elements undergoing formation in a forming apparatus of the type in which a plurality of containers are moved by a conveyor support, said battery cell elements being immersed in electrolyte in said containers and connected in series to provide a cell bank which bank is connected to a pair of charging current-carrying bus bars by brushes moving with said conveyor comprising, in combination, timing means for applying periodic direct current voltage pulses between one of said bus bars and ground, counting means moving with said cell elements on said conveyor and connected to said bus bar by means of the brush in contact therewith, said voltage pulses being of a magnitude sufficient to energize said counter, resistor means connected in series with said cell elements and carrying said charging current, and voltage sensitive relay means adapted to be energized by the voltage drop across said resistor means, said relay means being connected when energized to connect said counting means between said brush and ground for energization by said voltage pulses, said relay means being adapted for energization when the charging current flowing through said resistor means is sufficient to insure adequate charging of said cell elements, said counter indicating a count proportional to the time said cell elements receive said adequate charging current.

References Cited in the file of this patent

UNITED STATES PATENTS

| | | |
|---|---|---|
| 2,528,266 | Daily et al. | Oct. 31, 1950 |
| 2,595,373 | Stewart | May 6, 1952 |
| 2,621,316 | Lamm et al. | Dec. 9, 1952 |
| 2,647,236 | Saunderson et al. | July 28, 1953 |